Oct. 22, 1946. W. C. PREWITT 2,409,792
WEED BURNER
Filed Oct. 26, 1943 3 Sheets-Sheet 3

INVENTOR.
WILLIAM C. PREWITT
BY Darby & Darby
Attorneys.

Patented Oct. 22, 1946

2,409,792

UNITED STATES PATENT OFFICE 2,409,792

WEED BURNER

William C. Prewitt, Palm Beach County, Fla., assignor to United States Sugar Corporation, Clewiston, Fla., a corporation of Delaware Application October 26, 1943, Serial No. 507,688

12 Claims. (Cl. 126—271.2)

This invention relates to a machine for burning off weeds and other undesirable vegetation from cultivated areas.

The main object of this invention is to provide an improved and simplied mechanism for the destruction of obnoxious plants by burning in the form of a vehicle that can be passed over cultivated land.

A more specific object of the invention is to provide in such a machine a plurality of flame generators in the form, for example, of nozzles movably mounted and controlled from a central point so as to permit of an accurate positioning of the flame generators with respect to cultivated plants so that the obnoxious plants can be destroyed without injury to the cultivated plants.

Further and more detailed objects of the invention will be apparent from the following description of the embodiment of the invention illustrated in the attached drawings.

This invention resides substantially in the combination, construction, arrangement and relative location of parts as will be described in detail below.

In the accompanying drawings,

Figure 5 is an enlarged detailed view of the movable supporting mechanism for one of the flame generators as viewed from the line 5—5 of Figure 1 with parts in cross-section and parts broken away; and Figure 6 is a view similar to Figure 5 illustrating the manner in which the support is adjusted to change the position of the related flame generator.

The mechanism herein disclosed has practical utility because of the differential resistance of plants to flame and heat due to the natural relative characteristics of the plants themselves. Weeds and other obnoxious plants if taken in time are more sensitive to heat and hence more easily destroyed than the older cultivated plants which they surround. Thus properly directed and controlled flames may be employed to burn off or kill the undesired vegetation with little or no damage to the cultivated plants. In accordance with this invention, there is provided a machine in which the flame generators are so supported that they may be manually adjusted or positioned with respect to the uncultivated plants so as to effectively insure their destruction with little damage to the cultivated plants.

Figure 1:
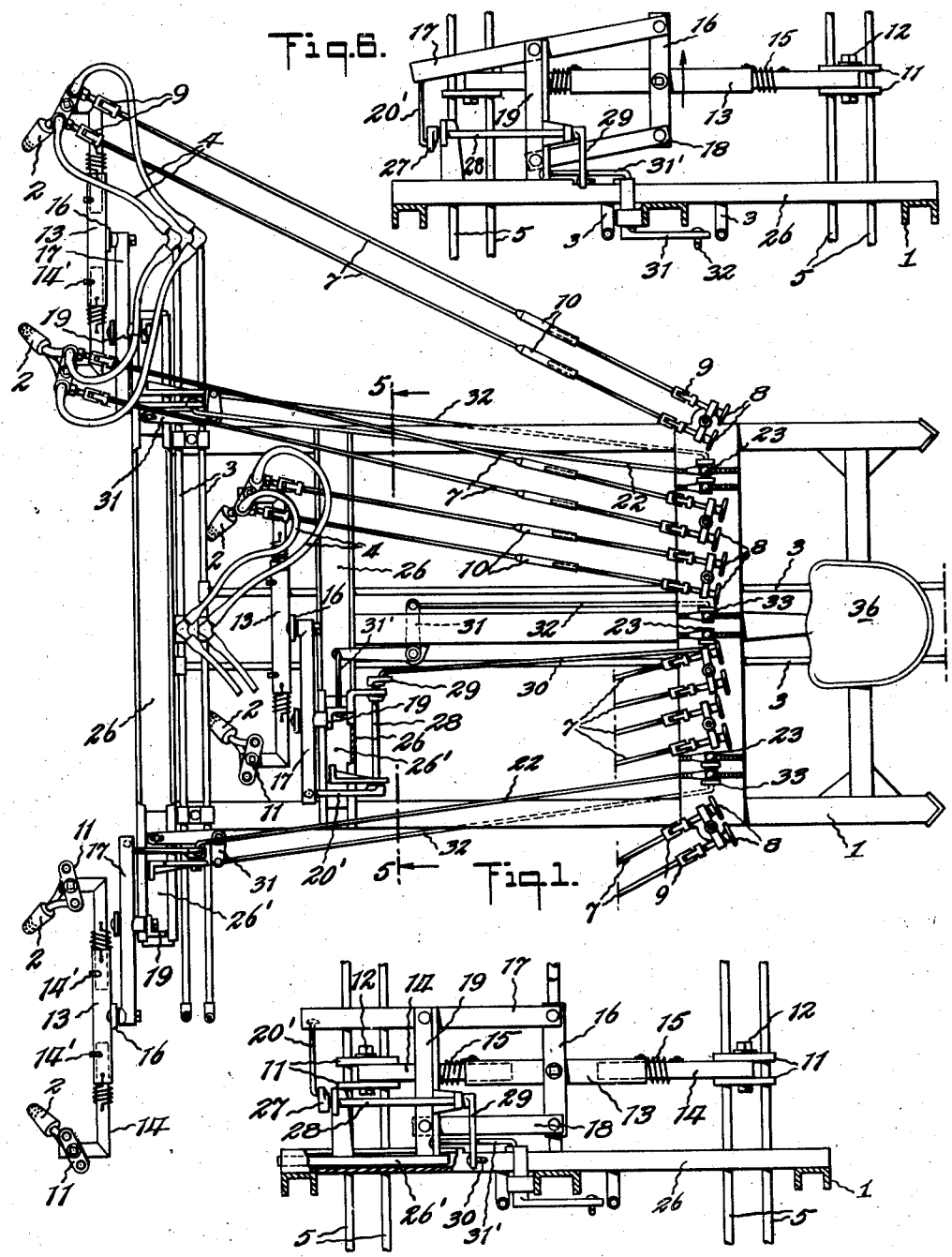
Figure 1 is a top plan view of a machine in accordance with this invention.

While the subject matter of this invention can be exemplified by various forms of physical structure, one suitable for accomplishing the objects of the invention has been illustrated in the drawings. As shown in the various figures, it comprises a chassis in the form of a sled or skid 1. The details of the chassis construction are relatively unimportant and it will be observed, therefore, that it generally comprises a framework supported on runners and intended to be dragged, as by a tractor for example, from the right hand end (Figure 1). Mounted on the chassis is an operator's seat 36 positioned at a control station, the nature of which will be described below, so as to face rearwardly with respect to the direction of movement of the chassis when in use. The flame generators are supported at the rear end of the chassis and hence are under direct observation of the operator when seated.

The flame generators are shown in the form of nozzles 2, the details of construction of which are not herein given in view of the fact that they may be made in many forms. Extending longitudinally of the chassis below its platform are the air and fuel supply pipes 3 which may be connected to suitable sources (not shown) of air and fuel either mounted on the chassis or on the tractor by means of which the machine is moved or drawn. The air and fuel pipes 3 extend to the rear of the chassis, as is clear from Figure 1, into transversely extending branches to which vertical extensions are attached at suitable points. In the machine illustrated, there are three pairs of flame generators 2 and, of course, a connection extends to each generator from the air and fuel lines. The generators or torches 2 each include a pair of vertical pipes 5 for supplying the air and fuel thereto which are respectively connected by flexible tubes 4 to the vertical branches of the main supply line. At the points of connection of the flexible tubes to the pipes 5 are the control valves 6 each of which has an elongated valve stem 7 connected at its ends by means of universal joints 9 to the valves 6 and the manual controls 8. Each valve stem 7 is provided with a slip connection 10 to automatically allow the necessary variation in length of the stems as the mechanism is adjusted as will be described below. All of the manual controls 8 are centered around the control point adjacent the seat 36 near the forward end of the chassis, as is clear in Figures 1 and 4. The details of construction of the universal coupling devices 9 and the slip connections 10 are not given since these may take various known forms.

Figure 4:
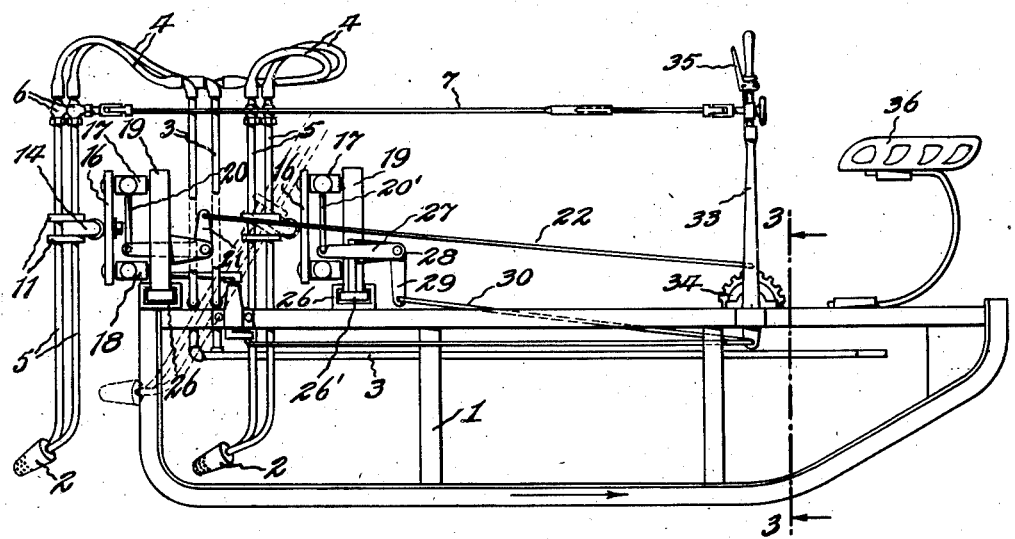
Figure 4 is a side elevational view of the machine.

Each pair of nozzle pipes 5 is connected in a clamp 11 which is pivotally mounted on a pivot pin 12 on one of the spreader elements 14. These spreaders comprise a relatively fixed tube 13 in the ends of which are rotatably mounted the L-shaped arms 14 on which the clamps 11 are mounted. Coil springs 15 interconnect arms 14 and tubes 13 to permit relative rotational movement therebetween. As indicated in Figure 1, the telescope ends of the arms 14 are provided with pins 14' that operate in slots in the tubes 13 to limit rotational movement of the arms 14 in the tubes 13 in the direction in which the springs act. These slots extend from this position in a direction so that each arm 14 may independently rotate, as illustrated in Figure 4, so that the nozzles can swing rearwardly in the event they meet an obstruction. As soon as they are released they swing back to their vertical position, as is shown in the full line in Figure 4. This motion is relatively unrestrained in view of the fact that the tubes 4 are flexible tubes.

Each spreader comprising the parts 13, 14 is pivotally mounted at the tube 13 on a vertical link 16 (see Figure 5) which is pivotally connected at its ends to a pair of links 17 and 18. The link 18 is pivotally mounted at its other end on a standard 19 and the link 17 is also pivotally mounted thereon but at a point intermediate its ends so as to provide a cantilever extension, as illustrated in Figure 5. The links 16, 17 and 18 and the standard 19 provide a linkage parallelogram which supports the spreaders. The normal position of the parts is illustrated in Figure 5 while a different position is illustrated in Figure 6 which position results in raising the pair of nozzles connected thereto in an apparent manner.

At this point it may be noted that the supporting linkage systems for the three pairs of nozzles are the same. Mechanism for operating the linkage systems differs slightly but merely for the purpose of facilitating its mounting on the particular machine illustrated. The adjusting mechanism for the central pair happens to be the one illustrated in detail in Figures 5 and 6 although the adjusting mechanism for the other two pairs of nozzles is clearly illustrated in Figure 4. Referring first to Figure 4, this mechanism includes a link 20 connected to the overhanging end of the link 17, as is clear particularly in Figure 2. The other end of the link 20 is connected to one end of a bellcrank lever 21 pivotally mounted on the standard 19. The remaining end of the bellcrank lever is connected by a long link 22 to a vertical lever 23 (see Figures 1 and 3). The lever 23 is at the control station and is provided with a latch operated by a hand manual similar to that clearly illustrated at 35 in Figure 4 for controlling a latch which cooperates with a fixed quadrant similar to the quadrant 34 of Figure 4 so that the lever 23 can be locked in any adjusted position. This latching mechanism is of a very well known type and has not, therefore, been illustrated in any more detail than is present in the figures. By moving the levers 23 forwardly and backwardly the bellcrank levers 21 can be given clockwise or counterclockwise rotation (Figure 4) to lower or raise the connected nozzles 2.

A similar but slightly different mechanism is provided for vertical adjustment of the central pair of nozzles. As illustrated in Figure 5 in this case the link 20' connects to a lever 27 on one end of a rotatably supported shaft 28 to the other end of which is attached a lever 29. The free end of this lever is connected by a link 30 which extends to the control station and is pivotally connected to another lever 23. Thus there is a lever 23 for each pair of nozzles.

The standards 19 are also laternally adjustable so that in addition to the vertical adjustment of the nozzle they may be shifted transversely in either direction with respect to a normal position. This is accomplished by reason of the fact that the standards 19 are attached to sliding blocks 26' slidably mounted in guideways formed in transverse channels 26. The two outside pairs of nozzles are mounted on the forward channel 26 while the central pair are mounted on a shorter and inwardly positioned channel 26. The mechanism for shifting each of the blocks 26' is substantially the same. It is best illustrated in Figure 1 where for each block 26' there is provided a bellcrank lever 31 pivotally connected at one end to the block and at the other end by means of a link 32 to a lever 33 pivotally supported at the control point and provided with a latch operated by a manual 35 and cooperating with a fixed quadrant 34.

A careful inspection of the drawings will show that there is a lever 33 for each pair of nozzles. As illustrated in the drawings, the levers 23 and 33 are mounted in pairs, there being a pair for each pair of nozzles. For any one pair of nozzles, lever 23 is operated to cause vertical adjustment of the nozzles and the lever 33 of that pair is operated to cause transverse shifting of the same pair of nozzles. Each nozzle of each pair is provided with a pair of air and fuel valve operating manuals 8. Thus all the controls for the nozzles are at the central control point adjacent the seat 36. Again there is a slight difference in structure in transverse shifting structure for the central pair of nozzles, as is clear from Figure 1. In this case, one end of the bellcrank 31 is connected by a link 31' to the standard 19 of the support for this pair. The operation, however, is the same as that for the other pairs.

Figure 2:
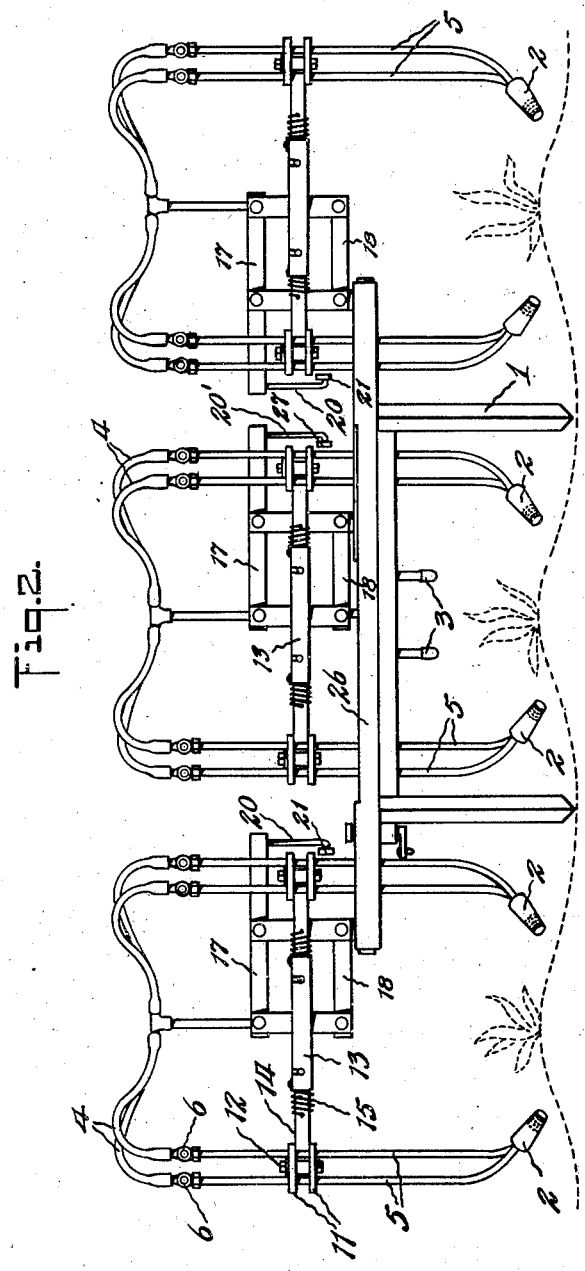
Figure 2 is a front elevational view thereof with the rearward parts removed.
Figure 3:
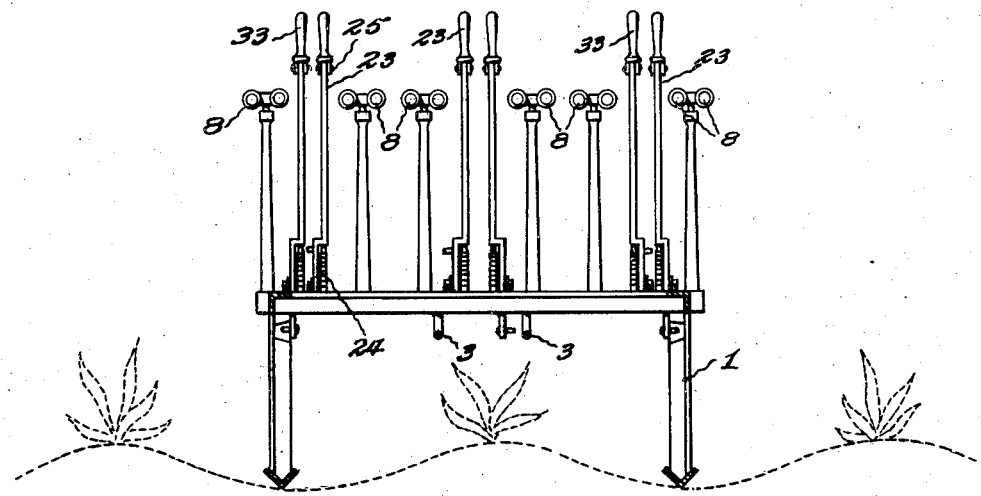
Figure 3 is a cross-sectional view taken on the line 3—3 of Figure 4 with the forward parts removed.

The relationship of the structure with regard to three rows of cultivated plants is illustrated in Figure 2. For the particular machine illustrated, it is drawn along the central row of the three being processed so that each pair of nozzles passes along opposite sides of one row of cultivated plants. By moving one or more of the levers 23 forwardly or backwardly the nozzle pairs may be moved up or down to just the desired position with relation to a particular flame adjustment, that is flame size and shape as determined by the control of air and fuel thereto. By moving one or more of the levers 33 forwardly or rearwardly, the associated nozzle pair can be moved laterally with respect to the row of plants so that one nozzle of the pair is brought nearer to the row and the other further away. These nozzle pairs can be adjusted to meet any alignment of rows and indeed any misalignment of rows of cultivated plants. The result is that the nozzle flames can be very accurately pointed or positioned with respect to the plants to insure that only the obnoxious vegetation surrounding them is destroyed with little or no damage to the cultivated plants. The locking devices for the levers 23 and 33 insure that the nozzles will remain in adjusted position until the next adjustment.

Since the nozzle pairs are moved about, as explained above, the valves stems 7 interconnect the manuals with the valves through universal joint couplers 9 and include the slip sleeves 10 so that it is not necessary to bend or bind the valve stems by reason of the shifting of the nozzles.

From the above description, it will be seen that the structure herein disclosed is of practical adaptability to varying conditions in the field and that the parts are relatively arranged and mounted so as to facilitate quick and accurate positioning of the nozzles and repositioning thereof as conditions require it. Skilled mechanics will readily perceive numerous variations in the particular physical structure selected herein for illustrative purposes and I do not, therefore, desire to be strictly limited to the selected embodiment but I would rather be, as is my right, restricted only by the scope of the claims granted me.

What is claimed is:

1. In a weed burning mechanism the combination including a portable chassis, a plurality of flame generators, means for supporting said generators in pairs on said chassis, means including controls on said chassis for supplying fuel to said generators, and means including controls on said chassis for positioning said generators in pairs relative to said chassis along two paths at right angles to each other, all of said controls being positioned for manipulation at a central control point.

2. In the combination of claim 1, said positioning means including transversely shiftable and vertically adjusable linkage frames, and the controls therefor comprising levers arranged at the central control point.

3. In the combination of claim 1, said positioning means including transversely shiftable and vertically adjustable linkage frames, and the controls therefor comprising levers arranged at the central control point, and said fuel supply means including pipe connections, valves and operating means including manuals for the valves, said means including manuals being positioned at the central control point.

4. In the combination of claim 1, the supporting means for the flame generators comprising a rectangular parallelogram of links pivotally connected, a spreader pivotally mounted on the parallelogram, means for mounting a flame generator at each end of the spreader, and means for changing the parallelogram from rectangular to oblique forms to effect vertical movement of said generators.

5. In the combination of claim 1, the supporting means for the generators including guide channels mounted on the chassis and vertically shiftable supports slidably mounted in said channels for transverse movement, and means for transversely shifting said supports by movement longitudinally of said channels.

6. In the combination of claim 1, the supporting means for each flame generator comprising a rectangular parallelogram of links pivotally connected, a spreader pivotally mounted on each parallelogram, means for mounting one of said flame generators at each end of each spreader, and means including controls on said chassis for changing each parallelogram from rectangular to oblique forms to effect vertical movement of said generators.

7. A weed burning machine of the type described including a vehicle chassis, a plurality of transversely shiftable supports mounted on said chassis, a plurality of spreaders, vertically shiftable means for mounting said spreaders on said supports, flame generators mounted on the ends of said spreaders in spaced pairs, and controls comprising levers pivotally mounted on said chassis at a central control point and connected to said supports for effecting shifting movement thereof.

8. In the combination of claim 7, said spreaders including relatively rotatable parts to permit rearward swinging of the generators.

9. In the combination of claim 7, said spreaders including spring biased relatively rotatably connected parts for allowing the generators to swing rearwardly when they meet an obstruction.

10. In a weed destroying machine of the type described, the combination including a vehicle chassis, means for generating a plurality of spaced flames including centrally grouped fuel controls therefor, means for movably supporting said generators on said chassis, and means for vertically and transversely shifting said generators relative to said chassis including controls likewise centrally grouped on the chassis for operation by an operator thereon.

11. In a machine of the type described, a vehicle chassis, a support for a nozzle slidably mounted on said chassis, a plurality of links pivotally interconnected to each other and to said support to form a parallelogram, means for pivotally mounting a nozzle on said parallelogram, means for relatively shifting the members of said parallelogram to effect vertical movement of the nozzle, and means connected to said support to cause sliding movement thereof transversely of said chassis.

12. In a machine of the type described a relatively fixed support, a linkage parallelogram comprising a plurality of pivotally interconnected links pivotally mounted on said support in a vertical plane, a spreader pivotally attached to one of said links, a pair of flame generators mounted on the ends of said spreader, and means for distorting the parallelogram to effect vertical movement of the generators, said spreader comprising a relatively fixed member and a pair of spring biased relatively rotatable members mounted therein to which the generators are attached.

WILLIAM C. PREWITT.